Jan. 11, 1944. E. D. COLEMAN 2,339,053
SPECTROPHOTOMETER
Filed Aug. 1, 1940 2 Sheets-Sheet 2
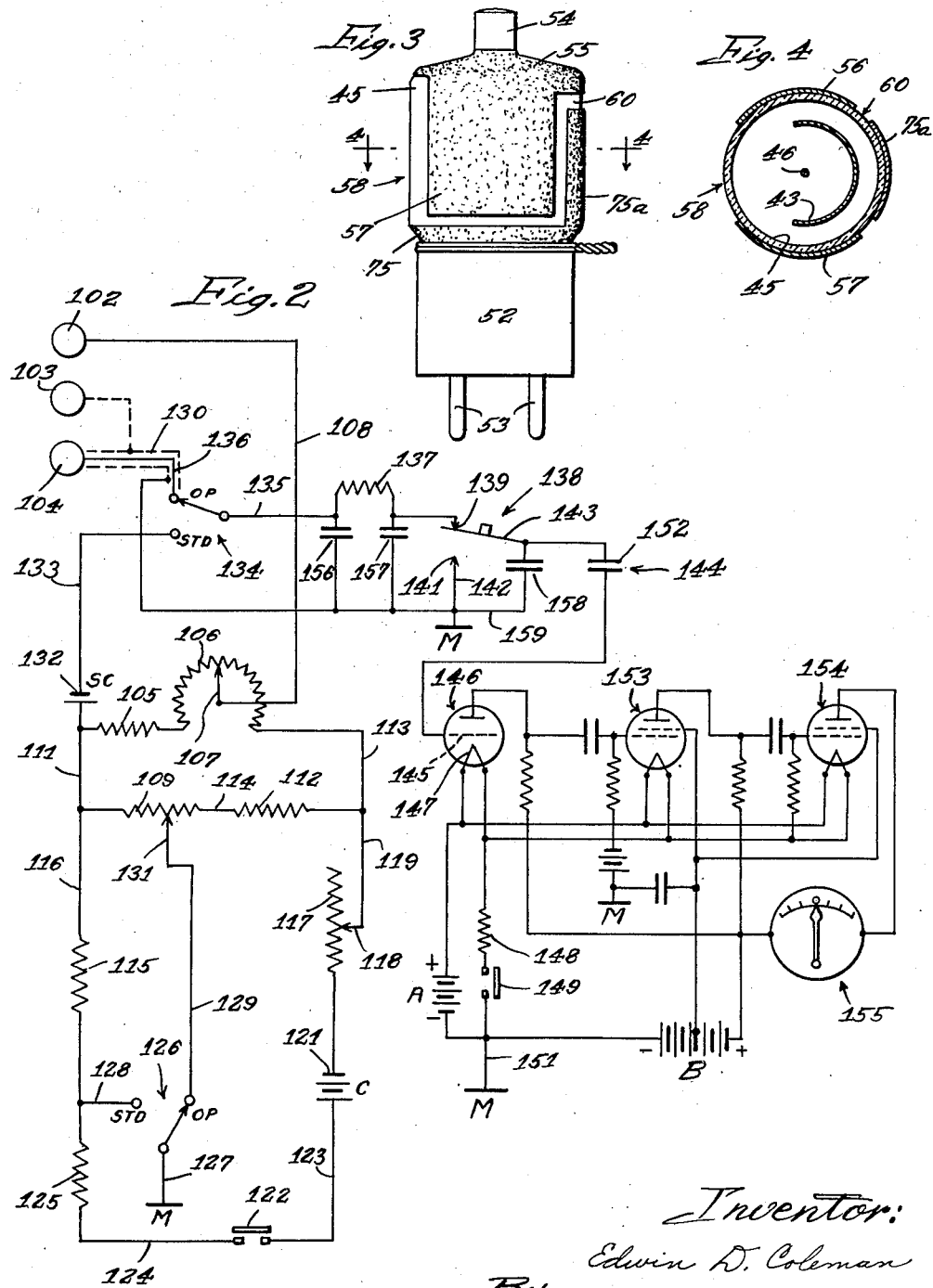
Inventor:
Edwin D. Coleman
By
McCanna, Wintercorn & Morsbach
Attys.

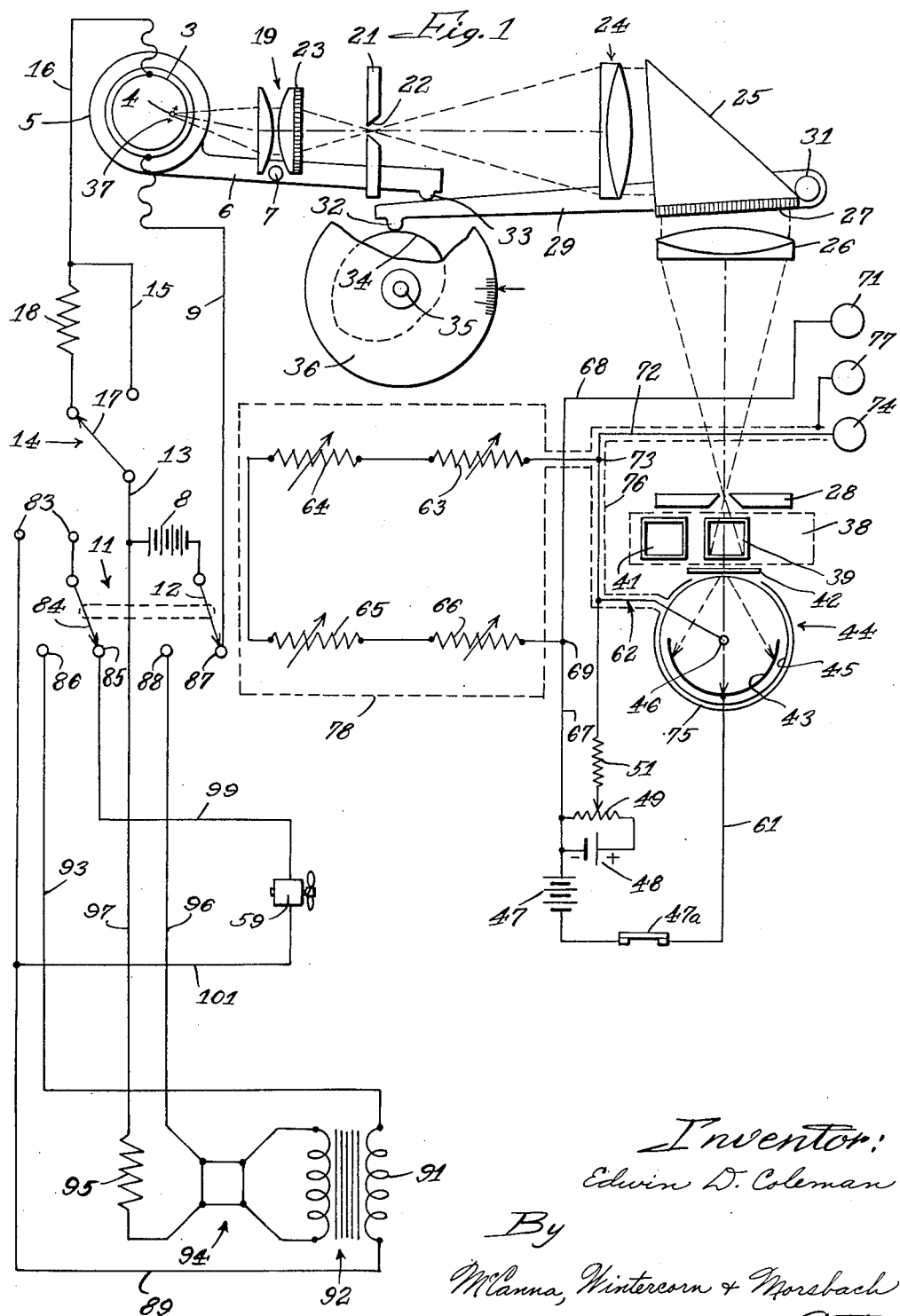

Patented Jan. 11, 1944

2,339,053

UNITED STATES PATENT OFFICE 2,339,053

SPECTROPHOTOMETER

Edwin D. Coleman, Maywood, Ill.

Application August 1, 1940, Serial No. 349,149

6 Claims. (Cl. 240—1)

This invention relates to spectrophotometers of the type adapted for test purposes, and has as an important object the provision of a self-contained compact instrument of simple operation and high accuracy.

A further object of the invention is the provision of a spectrophotometer having a novel and generally improved optical system.

I have also aimed to provide a spectrophotometer having novel means for illuminating the same and for monochromating the light used therein.

A further object of the invention is the provision of successive means for monochromating the light from a source and means for coordinating the action of the successive means to produce wave bands of great purity.

Other objects and advantages will become apparent from the following description and the accompanying drawings, in which—

Figure 1 is a diagrammatic view showing the optical system and a part of the electrical system of a spectrophotometer embodying my invention;

Fig. 2 is a diagrammatic view showing the remainder of the electrical system;

Fig. 3 is a side elevation of the phototube showing the coating thereon, and

Fig. 4 is a section on the line 4—4 of Fig. 3.

The invention is herein shown embodied in two units, one being the optical system and directly associated electrical parts, and the other being a potentiometer unit such as used in a number of well known makes of glass electrode hydrogen ion measurement devices. This arrangement offers a number of advantages, an important one being that in many instances it eliminates the necessity for duplication of equipment, since many laboratories already have on hand a pH electrometer suitable for making the actual measurements. Fig. 2 shows such an electrometer, while Figure 1 shows the optical system and associated parts of the spectrophotometer. Advantageously the elements shown in these two figures may be housed in separate cases and when used be electrically connected together through binding posts, as will be described. It will be understood that many phases of the invention as herein described and claimed are not limited to this specific arrangement, and that most of the advantages of the invention can be obtained by combining the entire device into one unit.

The embodiment of the invention herein disclosed contemplates a construction wherein the source of light comprises a prefocused incandescent lamp of the type having a filament in the shape of a relatively long coiled helix of small diameter, though it will be understood that the invention is not limited to this particular light source. The light from this filament passes through a simple condensing lens, thence through a diffraction grating which acts to spread the filament image and form a normal spectrum against a slit, whereby a wave band of reasonable purity may be directed through the slit. The wave band passing through the slit is caused to impinge upon an achromatic collimating lens, the parallel beam issuing therefrom being directed on a right prism which changes the direction of the beam through 90°. A second diffraction grating is in this instance positioned on the exit face of the prism, the wave band passing through this diffraction grating and thence through a second achromatic lens which focuses the spectrum on another slit parallel with the first. The slits and lenses are all arranged on the same optical axis. Means are provided behind the slit for supporting suitable test samples through which the wave band passing through the slit is caused to pass, thereafter impinging upon a diffusing screen. Behind the diffusing screen is a phototube, the cathode of which is positioned to receive the light and which tube is arranged to have a substantially linear response with respect to the illumination. Means are provided for measuring the change in response of the phototube occasioned by the manipulation of the sample to obtain the results necessitated by the science of spectrophotometry.

Referring first to Figure 1, the numeral 3 designates generally a prefocused incandescent lamp having a coil filament 4 in the form of a straight helix. In this particular instance the lamp is one made by General Electric Company and sold under the identifying style "Photo cell exciter lamp with offset C–8 filament 8½ volt, 4 ampere T8 bulb with single contact prefocused base." This lamp is carried on a base 5, in this instance formed as part of an arm 6 having a pivotal support at 7. The conventional socket means (not shown) is provided for fixing the prefocused position of the lamp. The filament of the lamp is arranged to be energized from a storage battery designated generally by the numeral 8 by way of a conductor 9 leading to one terminal of an "on-off" switch, designated generally by the numeral 11, through a conductor 12 of the switch to the battery, thence through a conductor 13 to a "high-low" switch, designated generally by the numeral 14 through conductors 15 and 16 to the opposite side of the lamp. This produces maximum brilliancy in the filament 4. By switching the "high-low" switch 14 to the full line position shown, current flows from the battery 8 to the lamp by way of the conductor 13, the conductor 17 of the switch and a resistance 18, the resistance 18 reducing the voltage on the filament and therefore reducing its brilliancy. Because of the relatively low battery drain of this small lamp, the emission of the lamp remains substantially constant during the time required for the making of the test, and the procedure is such that variation in light intensity over extended time intervals does not influence the measurements.

The light from the filament 4 is directed upon a simple condensing lens indicated generally by the numeral 19 and spaced from the lens 19 is a slit designated generally by the numeral 21 having an opening 22 in the plane of the filament 4. An image of the thin lamp filament would normally be brought to focus at the plane of the slit 21 by the condensing lens 19, but attached to the exit face of the lens is a diffraction grating 23 which acts to spread the anticipated filament image and form instead a normal spectrum against the face of the slit 21. The grating 23 is positioned so as to throw the bands of the spectrum in parallel relation with the opening 22, and while for many purposes an ordinary diffraction grating may be employed, I have found that highly improved results can be obtained by using a so-called "echelette" grating, such, for example, as that described by Dr. R. W. Wood, in his text book entitled "Physical Optics," in which the lines of the grating are shaped to throw the major portion of the light incident on the grating into one first order spectrum. In order to reduce the cost of the instrument, the diffraction grating employed is a replica grating formed on a thin sheet of transparent material such as cellulose acetate, and is attached across the flat face of the lens, in this instance, by cementing it directly thereto. Since diffraction gratings produce spectra with evenly spaced wave lengths, I am enabled to use a simple fixed slit for the purpose of isolating the desired wave bands.

As pointed out above, the echelette type of grating gives a very high ratio of first order intensity as compared to the intensity of the second and succeeding orders. The use of this type of grating therefore renders negligible the relative response of the instrument to the second order spectrum in regions where it overlaps the first order spectrum, and also greatly increases the relative response to the first order spectrum as compared to scattered radiation from other orders. The result is that the instrument may be used with satisfactory accuracy for absorption measurements into the infra-red well below the visible range and in the areas in which the first and second orders overlap because the energy in the second order is so small as compared to that in the first order as to be negligible in its effect on the results.

The so-called monochromatic light, or in other words, the wave band passing through the opening 22 impinges upon an achromatic collimating lens 24 which acts to render the light parallel, which thereafter issues from the exit face of the lens in the form of parallel light. The light then strikes a right prism 25 from which it is reflected to a second achromatic lens 26, the prism acting merely to change the direction of the beam. Positioned on the exit face of the prism 25 is a second diffraction grating 27 of the same type as the grating 23 which serves to spread the image of the monochromatic light source comprising the opening 22 and form instead of such image a second spectrum in which the predominant wave length of the source 22 appears on a second slit 28 as a brilliant band from which the stray light of other wave lengths is separated and projected as side bands, thus producing at the opening of slit 28 a monochromatic wave band of high intensity and purity by virtue of the fact that the wave band has been twice monochromated. The degree of this purity can be varied by varying the width of the openings in the slits 21 and 28, and the invention contemplates that fixed slits of different sizes may be introduced into the optical system. Ordinarily slits having an opening of 30 millimicrons will be found satisfactory as giving a sufficiently narrow wave band without too greatly reducing the intensity.

The prism 25 is mounted on a lever 29 having a pivotal support on a center, as indicated at 31, and projecting forwardly toward the lever 6. The end of the lever 29 has a cam follower 32 while the end of the lever 6 has a follower 33 which bears against the side of the lever 29. The follower 32 bears against a cam 34 carried on a shaft 35 which also carries a dial 36 graduated in units of wave length such as millimicrons or angstroms. The levers 6 and 29 and the cam 34 are so shaped and proportioned that upon rotation of the dial 36, the lamp 3 and the prism 25 are moved in unison so that the same wave lengths of spectra produced at the slits 21 and 28 are simultaneously projected through the openings at all positions of the dial 36. It will be seen that as the lever 6 is rotated about its axis 7, the lamp filament describes an arc, shifting the position of the spectrum across the slit 21. It will also be seen that this simultaneously alters the distance between the filament and the lens 19 in such manner that as the spectrum moves, the filament is brought closer to the lens as the wave length of the light striking the opening 22 decreases, thereby maintaining the focus on the slit with change in the wave length of the light. The filament moves along an arc as indicated at 37, the center thereof being the pivotal support 7 of the lever 6.

A sample carriage designated generally by the numeral 38 is positioned at a point just beyond the plane of the slit 28, and is designed to support a pair of cuvettes designated generally by the numerals 39 and 41, one of the cuvettes being intended for the reception of a sample, and the other for the reception of a reference mass, as used in this art for the purpose of comparison or standardization. The carriage 38 is movable transversely to bring either of the cuvettes into the path of the wave band passing through the opening of the slit 28. The wave band passing through the slit 28 passes through one of the cuvettes, and thereafter impinges against a diffusion plate indicated by the numeral 42 designed for the purpose of destroying the optical control of the system at this point and producing uniform diffused illumination. In this instance this plate is a piece of etched glass. The wave band then passes from the diffusion plate 42 onto the cathode 43 of a phototube designated generally by the numeral 44. By thus diffusing the wave band, the photosensitive surface of the cathode 43 is uniformly illuminated at all times so that even though the cuvettes may cause a minor displacement of the beam and the surface of the cathode may not be of uniform sensitivity, the phototube response remains substantially independent of this beam displacement.

The phototube 44 is preferably of the type constructed to have and maintain a very high vacuum within the glass walls 45 thereof and utilizes a caesium oxide cathode. One suitable tube when modified as hereinafter described is that manufactured by Continental Electric Company, of Geneva, Illinois, and designated on the market under the name C. E. 13V. This tube is very stable, and its resistance at any given wave length is in substantially exact linear proportion to the illumination incident thereon. The response of this tube is also substantially independent of the voltage applied thereto provided the voltage remains sufficient to attract to the anode 46 thereof all of the electrons released at the cathode 43 by phototronic action. With the particular tube herein described this condition is substantially met when the applied voltage reaches 75 volts. This I have termed the saturation voltage of the tube. Power is supplied to the phototube from a batery 47 which may suitably be a dry battery capable of supplying a steady voltage from about 100 to 200 volts. The battery is connected to the tube in the usual way, by way of conductor 61 to the cathode of the tube, conductor 62 from the anode of the tube, a decade comprising the variable resistances 63, 64, 65 and 66 and a conductor 67. The battery in this instance produces a voltage of approximately 180 volts, and since the required voltage drop in resistances 63—66 never exceeds 600 millivolts, linear response of the phototube will be produced. If desired, a high voltage rectifier capable of producing the same voltage may be substituted for the battery 47.

The phototube 44, battery 47, and resistances 63—66 complete a series circuit, and any current from the phototube must pass through the resistances 63—66. Therefore, at any given wave length incident on the cathode of the phototube, the potential produced across the resistances 63—66 is, like the current, strictly proportional to the intensity of illumination of the phototube. It is, however, also proportional to the magnitude of the resistances 63—66 in the circuit which may be varied at will by adjustment of the decade. This decade adjustment is necessary because, while the response of the phototube is strictly linear at any given wave length, it varies widely as a non-linear function with respect to wave length. The variable resistances 63—66 provide means for producing "unity potential" when "unity illumination" is applied to the phototube at the selected wave length. By "unity illumination" I mean not an absolute value, but instead, any illumination of any wave length projected into the phototube through a reference material, as, for instance, air or material contained in the cuvette 41.

To facilitate measurement of the change in potential produced across resistances 63—66 in response to changes in illumination on the phototube occasioned by positioning the sample 39 in the path of the wave band passing through the slit 28, I provide a conductor 68 connected to the conductor 67 as indicated at 69 and connected to a binding post 71, and also provide a conductor 72 connected to the conductor 62, as indicated at 73, the opposite end of the conductor 72 being connected to a binding post 74 on the outer face of the instrument.

In order to nullify the effect of possible electrical leakage either over the phototube or past the resistances 63—66, I provide a conducting guard ring 75 coated on the outer surface of the tube 44 and extending therearound adjacent the base thereof, this guard ring together with a tubular metallic shield 76 which encloses the conductors 62 and 72 being connected to a binding post 77 on the outer surface of the instrument, this guard ring and shielding tube acting to intercept any leakage currents and prevent their interference with the accuracy of the instrument. A shield designated generally by the numeral 78 and preferably formed of a metallic enclosure or other equivalent means is connected to the binding post 77 in this instance through the shield 76. Any leakage which may not be diverted by the shields 76 and 78 and guard ring 75 is compensated by current produced by a circuit including a battery 48, a voltage divider 49 and a high resistance 51 which introduces into conductor 62 an equal and opposite leakage current.

Directing attention now more particularly to the phototube and to Figs. 3 and 4, the tube has the usual base 52 provided with conducting prongs 53, the glass bulb 45 in which is positioned the cathode 43 and anode 46, the latter being connected to a conventional cap 54 to which conductor 62 is connected.

As previously pointed out, the linear response of the tube to light incident on the inner surface of the cathode 43 is based upon the necessity of all of the electrons reaching the anode 46 and that the response of the tube for measurement purposes is adversely effected where the electrons do not reach the anode. This sometimes occurs when the electrons leave the cathode at an adverse angle, the result being that the electrons reach the walls of the tube and are thus lost to the circuit. I have found that this can in a large measure be corrected by spraying or otherwise coating the outer surface of the tube with a layer of conductive material such as metal in intimate contact with the glass, and connecting this layer with the anode. Thus I provide a coating covering the top of the tube as shown at 55 and extending downwardly along the sides as shown at 56 and 57, the lower edges thereof being spaced from the upper edge of a guard ring 75 formed in like manner by coating the outer surface of the glass adjacent the base 52. The downwardly extending panels 56 and 57 thus leave a window 58 opposite the sensitive face of the cathode and a space at the rear of the cathode into which space the guard ring coating 75 extends, as shown at 75a, the guard ring and extended anode being separated throughout the circumference of the tube by a space 60.

The coating 55, 56 and 57 acts as an extended anode which conducts to the anode 54 any electrons which may strike the inside of the tube and migrate through to the exterior and thus decrease the accuracy of the phototube. Were this coating not present, these electrons would in part leak erratically along the glass bulb 45 to guard ring 75, causing a departure from linearity in the phototube, depending upon humidity and atmospheric conditions which affect the surface conductivity of the bulb.

Power is supplied to the instrument for charging battery 8 and for operating the fan 59 from power supply lines 83, one of these lines being connected to the "on-off" switch 11 having a movable conductor 84 for establishing contact with switch terminals 85 or 86, the switch being arranged in such manner that the switch conductors 12 and 84 simultaneously make contact either with the switch contact 85 and the contact 87 on the conductor 9 or with contacts 86 and a contact 88. One of the power lines 83 is connected by a conductor 89 to the secondary 91 of a transformer designated generally by the numeral 92, a conductor 93 connecting the secondary 91 with the contact 86, whereby the transformer will be energized when the switch 11 occupies its "off" position. This transformer 92 is cononected to a rectifier 94 and the ballast resistor 95 to form a trickle charger. An output lead 96 of the charger is connected to the contact 88 whereby in the "off" position circuit is established to the battery 8 through the conductor 12 and through an outlet lead 97 from the charger so as to charge the storage battery when the device is out of service. The fan 59 acts to circulate air through the case containing the optical system and lamps to keep the cuvettes, sample and phototube at atmospheric temperature while the device is in use. Current is supplied to the fan motor through contact 85 by way of conductors 99 and 101.

The mechanism heretofore described constitutes the optical and power supply system of the spectrophotometer and advantageously may be housed in a cabinet in the usual way. It will be understood, of course, that this mechanism is carried on a suitable frame structure, and that the optical system is likewise supported on a suitable rigid frame structure which retains the elements in their proper place and which is enclosed against the entrance of extraneous light. The wave length cam 34 will, of course, have a suitable knob for rotating the shaft 35, and the variable resistances 63—66 will be provided with control knobs in accordance with the usual practice.

Directing attention now more particularly to the potential measuring device, as heretofore mentioned this may advantageously consist of a pH meter of proper design, though obviously other means may be employed for accomplishing this function, such as other electronic potentiometers or a quadrant electrometer. Where such a meter is employed it must be of a type capable of operating through the range of the resistances 63—66, must be substantially immune to strays, and must be so calibrated that its scale zero corresponds to zero input potential, otherwise the meter should be modified to meet these requirements.

One suitable form of pH meter is that shown in Fig. 2, wherein binding posts 102, 103 and 104 are connected to the binding posts 71, 77 and 74, respectively, when used as a part of the spectrophotometer. In this pH meter the binding post 102 is connected to a potentiometer circuit including a resistance 105 connected to a potentiometer resistance 106 having a slider 107 to which the binding post 102 is connected by a conductor 108, a variable resistance 109 connected to the resistance 105 by means of a conductor 111, a resistance 112 connected to the potentiometer resistance 106 by a conductor 113 and to the variable resistance 109 by a conductor 114, a resistance 115 connected to the conductor 111 by means of a conductor 116, a variable resistance 117 having a slider 118 connected to the conductor 113 by means of a conductor 119, a battery 121, one terminal of which is connected to the resistance 117, a switch 122, one side of which is connected to the other terminal of the battery 121 by a conductor 123, the opposite side of which is connected to the resistance 115 through a conductor 124 and resistance 125. A switch 126 having two positions indicated by the letters "Std." meaning "Standardized," and the letters "Op." meaning "Operate," the "Std." position connecting a McClure circuit indicated generally by the numeral 127, either to the conductor 124 by way of a conductor 128 or to a conductor 129 connected to the slider 131 of the variable resistance 109. A standard cell 132 is connected to the conductor 111 and has a lead 133 connected to a switch 134 through a contact marked "Std." and having the significance mentioned above, the switch serving to connect a conductor 135 either to the conductor 133 from the potentiometer assembly or to a conductor 136 attached to the binding post 104 and thence to the point 73 of Figure 1. The conductor 136 is enclosed within a shield 130 electrically connected with the binding post 104. The conductor 135 is connected to an amplifier or other voltage detecting device presently to be more fully described, but which functions for the purpose of determining when the potentiometer assembly is brought into electrical balance with the potential existing between the binding posts 71 and 74 of the phototube circuit. The standard cell 132 is connected to oppose the potential of resistance 115, and in balancing the bridge, the two potentials are exactly balanced by moving slider 118 of resistance 117, the point of balance being indicated by the amplifier assembly presently to be described.

When the potentiometer circuit is balanced or standardized, the switches 126 and 134 are moved to the Operate position and the potential between the points 69 and 73 is then opposed to the potential between the point of the slider 107 and the point of the slider 131. By moving the slider 107 the point can be reached on the potentiometer at which these two potentials exactly balance out, as indicated by the amplifier assembly. In a device of this type the potentiometer comprising the resistance 106 and slider 107 is calibrated in terms of pH so that the pH of the solution can be read directly from the dial thereof. Likewise, this dial can be used to read percent transmittance directly when the spectrophotometer is used in the manner hereinafter described.

An impulse amplifier functions to determine the condition when the potential of the potentiometer assembly is equal and opposite to the potential between the points 69 and 73 and hence between the binding posts 71 and 74, and functions also for the purpose of standardizing the bridge, depending upon the position of the switches 126 and 134, the procedure so far as the amplifier is concerned being identical. Assuming the switch is to be in the "Op." position, the lead 136 is then connected to the conductor 135 and through a resistance 137 to a switch 138 having a contact 139. The contact 139 is accordingly in series with the points 69 and 73 by way of resistance 137, conductor 135, switch 134, conductor 136, binding posts 104 and 74, conductor 72, variable resistances 63—66, point 69, conductor 68, binding posts 71 and 102, conductor 108 to potentiometer 106, from the potentiometer 106 to the slider 131 of resistnce 109 and from slider 131 through switch 126 to the McClure circuit. An opposite contact 141 of the switch 138 is likewise connected to the McClure circuit by a conductor 142. The switch 138 has a movable switch blade 143 connecting through a condenser 144 to the grid 145 of a vacuum tube 146. The filament 147 of this tube is also connected to the McClure circuit through a resistance 148, a switch 149 and a conductor 151.

It will be apparent that if the potential between the sliders 107 and 131 is not equivalent to the potential between the binding posts 71 and 74, there will be a difference in potential between contacts 139 and 141. Switch blade 143 normally engages contact 141 and when moved from this position to engagement with contact 139, if such difference in potential exists, there will be a change of potential on element 152 of condenser 144, and this will be transferred and expressed as a pulse or change in potential on the grid 145 of vacuum tube 146. On the other hand, when the potential between the sliders 107 and 131 of the potentiometer assembly is equal and opposite to that between the binding posts 71 and 74, contacts 139 and 141 will be at the same potential, and under these circumstances switch blade 143 may be moved from engagement with contact 141 to contact 139 without affecting the potential of grid 145. The vacuum tube 146 is resistance connected as the first step in a cascade including additional tubes 153 and 154 arranged as will be apparent from the drawings, and in the plate circuit of the third tube 154 of this cascade a meter 155 is connected. It will be seen that as the potential of the grid 145 of the first tube is altered by movement of the switch blade 143, the change will be reflected on the meter 155, and it will further be seen that with any given potential difference between the binding posts 74 and 71, within the range of the instrument, there will be a position of the potentiometer slider 107 at which this difference in potential will be exactly balanced, under which circumstances there will be no change in the reading of the meter 155 as the switch blade 143 is moved between its contacts, and by this means the difference in potential between the binding posts 71 and 74 as modified by the decade including the resistances 63—66 can be read from the scale of the potentiometer 106.

In order to eliminate any possible effect of stray fields, the high impedance 137 is provided together with condensers 156 and 157. This combination constitutes a filter network, and good results can be obtained when the impedance 137 is approximately 10 megohms and condensers 156 and 157 are approximately 0.002 microfarad. The condensers 156 and 157 return to a point at McClure potential which is the same as the potential of conductor 136 at the condition of balance. Consequently, under these circumstances, it is impossible for electrical leakage to occur through condensers 156 and 157. I have also found it advisable to employ a third condenser 158, one side being connected with the switch blade 143 and the condenser 144, and the other side being connected to McClure circuit as indicated at 159. By so doing, extraneous contact potentials which might be produced when the switch blade moves between the contacts 139 and 142 are largely eliminated.

Operation

The method of operating the spectrophotometer is as follows: The "on-off" switch 11 is switched to the "on" position energizing switch on phototube and the lamp 3. The wave length dial 36 is thereupon adjusted to the selected wave length, causing adjustment of the position of lamp 3 and the prism 25 to cause the desired wave band to become incident upon the cathode 43 of the phototube. A reference substance is introduced into the cuvette 41 or the cuvette may be removed where air is the reference material and the carriage 38 moved to interpose the cuvette 41 behind the slit 28 and thereby cause the selected wave band to traverse the reference material and thereafter to be incident on the cathode 43. Thereupon the potentiometer 106 (Fig. 2) is set to unity, preferably to 10 on the pH scale carried thereon. The decade comprising the variable resistances 63—66 is then adjusted until upon actuation of the switch 138 no deflection occurs in the meter 155 indicating that the potential generated in the potentiometer circuit is equal to the potential difference between binding posts 71 and 74. The sample is then placed in the cuvette 39 and interposed in the path of the selected wave band. This causes the illumination on the cathode 43 to change, changing the potential in the phototube circuit and consequently the potential at the binding posts 71 and 74. The potentiometer 106 is then adjusted as required so that no deflection of the meter occurs upon operation of the switch 138. The reading of the scale of the potentiometer 106 then gives directly the percent transmittance of the sample. By repeating the "unity" balance of the device for each wave band and testing the sample at a succession of wave bands, sufficient points may be determined to trace a spectro transmission curve.

At infrequent intervals it may be necessary to adjust the leakage compensation circuit by means of the voltage divider 49. This may be done by providing on the carriage 38 means for stopping the passage of light to the phototube or by stopping the light in any other way so that the phototube becomes dark. The decade comprising the variable resistances 63—66 is then adjusted to give zero resistance. The potentiometer 106 (Fig. 2) also is set to zero and the variable resistance 109 is adjusted until upon actuation of the switch 138 no diffraction occurs in the meter 155. Under these conditions, zero potential difference across the binding posts 71 and 74 gives zero reading on the dial of the potentiometer 106. The decade is then turned to provide a maximum resistance and the voltage divider 49 is adjusted until upon actuation of the switch 138 no deflection occurs in the meter 155. When these adjustments have been made, any leakage current across phototube 44 from cathode 43 to anode 46, which is not occasioned by the wave band from slit 28, is completely canceled and can cause no indication on the electrometer for any position of the decade resistances 63—66.

I claim:

1. The combination in a spectrophotometer of an incandescent lamp having a straight line filament, a condensing lens upon which the emission of said filament is incident, a slit positioned near the focal point of said lens in substantial parallelism with said filament, a diffraction grating interposed between said lamp and said slit for dispersing the image of said filament over said slit as bands of a spectrum in substantial parallelism with said slit, and means for moving said lamp laterally to shift the spectrum across the opening of said slit and for moving said lamp toward and away from said lens with change of the wave length brought into registration with the opening of said slit to keep the bands focused upon said opening with change of wave length.

2. The combination in a monochromator of a source of light comprising an incandescent lamp having a straight line filament, a condensing lens upon which the emission of said filament is incident, a slit positioned near the focal point of said lens in parallelism with said filament, a diffraction grating interposed between said lamp and said slit for dispersing the image of said filament over said slit as a spectrum, means for supporting said lamp for movement of said filament laterally of said slit to shift the spectrum across the opening of said slit and thereby select different wave bands and for movement of said filament toward and away from the lens with change of wave length passing through said slit to keep the spectrum focused on said slit, a second slit disposed in optical parallelism with said first mentioned slit, a reflecting means and a second diffraction grating disposed in the path of the wave band between said slits, means for supporting said reflecting means for angular movement to direct different portions of said wave band onto said second slit, and a graduated adjusting member arranged to simultaneously actuate said lamp supporting means and said reflecting means support to move said filament and said reflecting means in unison and thereby provide a spectral band of high purity through said second slit.

3. The combination in a spectrophotometer of a first monochromator including a slit having an opening and an echelette diffraction grating for producing a spectrum thereon wherein the axis of wave length change is perpendicular to the opening of the slit, a second monochromator receiving the emission of said slit including a slit having an opening and an echelette diffraction grating for producing a spectrum on said slit wherein the axis of wave length change is perpendicular to the opening of the slit, and means for relatively shifting the spectrum with respect to the slits to produce a purified spectral band through said second slit.

4. The combination in a monochromator of an incandescent lamp constructed to provide a straight line source of light, a condensing lens upon which the emission of said source is incident, a slit positioned near the focal point of said lens in parallelism with said source, a diffraction grating interposed between said lamp and said slit for dispersing the image of said source over said slit as a spectrum to produce a substantially monochromatic source at said slit, means for monochromating the wave band passing through said slit, and means for moving said lamp laterally to shift the spectrum across the opening of said slit and thereby select different wave bands, said means being shaped and supported to move said lamp toward and away from the lens with change of wave length passing through said slit to keep the spectrum focused on said slit.

5. The combination in a monochromator of a source of light of substantially constant intensity, a condensing lens upon which the emission of said source is incident, a slit positioned substantially at the focal point of said lens, a diffraction grating interposed between said source and said slit for dispersing the image of said source over said slit as spectral bands substantially parallel with the longest dimension of said slit to produce substantially a monochromatic source at said slit, an achromatic collimating lens in the path of the wave band from said slit, a reflecting prism receiving the wave band from said collimating lens, a second achromatic lens receiving the wave band from said prism, a second diffraction grating between said prism and said second achromatic lens having its longest dimension in substantial parallelism with said spectral bands for receiving a spectrum therefrom, a second slit, and means for simultaneously moving said source of light to project wave bands of different wave lengths through said first slit and rotating said prism to direct the band passing through said first slit against said second slit.

6. The combination in a spectrophotometer of a light source in the shape of a straight line, a condensing lens upon which the emission of said source is incident, a slit positioned near the focal point of said lens in substantial parallelism with said source, a diffraction grating interposed between said source and said slit for dispersing the image of said source over said slit as bands of a spectrum in substantial parallelism with said slit, and means for simultaneously moving said source in a direction at right angles to the optical axis of said lens to bring light of the desired wave length into register with said slit and in a direction parallel to said axis to focus the wave band in register with said slit at the plane of said slit.

EDWIN D. COLEMAN.